United States Patent
Zecchi et al.

(10) Patent No.: US 8,322,359 B2
(45) Date of Patent: Dec. 4, 2012

(54) GAS PRESSURE REGULATOR AND METHOD FOR ASSEMBLING AND DISASSEMBLING THE REGULATOR

(75) Inventors: Stefano Zecchi, Bologna (IT); Andrea Monti, Funo de Argelatio (IT)

(73) Assignee: O.M.T. Officina Meccanica Tartarini S.r.I., Castel Maggiore (Bologna) (IT)

( * ) Notice: Subject to any disclaimer, the term of this patent is extended or adjusted under 35 U.S.C. 154(b) by 193 days.

(21) Appl. No.: 12/794,659

(22) Filed: Jun. 4, 2010

(65) Prior Publication Data

US 2010/0243080 A1   Sep. 30, 2010

Related U.S. Application Data

(62) Division of application No. 11/387,306, filed on Mar. 23, 2006, now Pat. No. 7,748,401.

(30) Foreign Application Priority Data

Mar. 25, 2005 (IT) .............................. BO2005A0197

(51) Int. Cl.
*F01L 3/10* (2006.01)

(52) U.S. Cl. ............. 137/15.18; 137/15.19; 137/315.05; 137/315.41; 251/337; 251/61.2; 251/61.4

(58) Field of Classification Search ............. 137/315.05, 137/315.41, 495, 505.14, 906, 15.18, 15.19, 137/454.6, 489, 270, 269; 251/337, 61.2, 251/61.3, 61.4, 61.5

See application file for complete search history.

(56) References Cited

U.S. PATENT DOCUMENTS

| | | | |
|---|---|---|---|
| 2,520,216 A | 8/1950 | Kounovsky et al. |
| 3,253,610 A | 5/1966 | Pahl et al. |
| 3,556,463 A | 1/1971 | Williams |
| 3,621,875 A | 11/1971 | Alexander |
| 3,648,718 A | 3/1972 | Curran |
| 3,987,818 A | 10/1976 | Williams |
| 4,098,487 A | 7/1978 | Bauer |
| 4,137,934 A | 2/1979 | Rice et al. |
| 4,508,132 A | 4/1985 | Mayfield, Jr. et al. |
| 5,419,365 A | 5/1995 | Jezek |
| 5,492,146 A | 2/1996 | George et al. |
| 5,771,924 A | 6/1998 | Huygen |
| 5,964,446 A | 10/1999 | Walton et al. |
| 6,042,081 A | 3/2000 | Anderson |
| 6,056,003 A | 5/2000 | Madsen et al. |

(Continued)

FOREIGN PATENT DOCUMENTS

DE          3504785          10/1985

(Continued)

OTHER PUBLICATIONS

International Preliminary Report on Patentability for Application No. PCT/IB2006/000924, dated Sep. 25, 2007.

(Continued)

*Primary Examiner* — Kevin Lee

(74) *Attorney, Agent, or Firm* — Marshall, Gerstein & Borun LLP

(57) ABSTRACT

A gas pressure regulator comprises a main body having a first, gas inlet pipe and a second, gas outlet pipe, a calibrated gas passage through which gas flows from the first pipe to the second pipe, a shutter housed at least partially in the main body and mobile lengthwise along a first defined line to adjust the opening of the calibrated passage, a device for actuating the shutter and a regulator spring unit opposing the movement of the shutter.

19 Claims, 9 Drawing Sheets

U.S. PATENT DOCUMENTS 7,647,942 B2 * 1/2010 Weston ............... 137/454.6
7,748,401 B2 * 7/2010 Zecchi et al. ............ 137/315.05

FOREIGN PATENT DOCUMENTS

| | | |
|---|---|---|
| FR | 2466800 | 4/1981 |
| GB | 2155114 A | 11/1983 |

OTHER PUBLICATIONS

International Search Report for Application No. PCT/IB2006/000924, dated Mar. 21, 2006.

Written Opinion for Application No. PCT/IB2006/000924, dated Mar. 21, 2006.

* cited by examiner

GAS PRESSURE REGULATOR AND METHOD FOR ASSEMBLING AND DISASSEMBLING THE REGULATOR

CROSS-REFERENCE TO RELATED APPLICATIONS

This application is a divisional application of U. S. patent application Ser. No. 11/387,306 filed on Mar. 23, 2006 (now U.S. Pat. No. 7,748,401), which claims priority to Italian Application No. BO2005A 000197 that was filed on Mar. 25, 2005.

TECHNICAL FIELD

This application relates to a gas pressure regulator and in particular relates to a pilot-operated pressure regulator suitable for installation on gas transportation and distribution pipelines

BACKGROUND ART

Pressure regulators currently used are also commonly known as "pressure reducers" because their regulating action is achieved by reducing the gas delivery pressure through laminar flow elements.

Regulators known in prior art basically comprise a main body with an inlet through which gas flows in at high pressure and an outlet through which the gas flows out at reduced pressure. This main body houses means for controlling and regulating the gas flow.

The controlling and regulating means comprise at least one shutter, actuated by spring and diaphragm systems which enable the shutter to slide on its shaft, and a pilot device which measures the pressure of the gas upstream and downstream of the regulator and controls the shutter actuating diaphragm accordingly.

In other words, the diaphragm divides the volume delimited by two flanges into two chambers. The pressure in one of the chambers is a regulating pressure set by the pilot device whilst the other chamber is in fluid communication with the pipe downstream of the outlet and, therefore, the pressure in it is the aforementioned reduced pressure.

During operation under balanced conditions, that is to say, when the pressure upstream and downstream of the regulator is substantially equal, the pilot device keeps the regulating pressure constant and the shutter remains in the same position.

When the pressure downstream or upstream of the regulator varies, the pilot device changes the regulating pressure in such a way as to act on the spring and diaphragm system to change the position of the shutter accordingly.

In the spring and diaphragm system, a regulating spring acting directly or indirectly on the shutter opposes the action of the regulating pressure on the diaphragm. The spring therefore tends to close the shutter.

Usually, the change in the position of the shutter results in a change in the operating parameters of the regulator which accordingly adapts to the new conditions in order to contribute to adjusting the downstream pressure to the set value.

Routine maintenance operations involve periodically checking and substituting the seals and seal pads that are engaged by the moving parts of the regulator, that is to say, in contact with the shutter.

To do this in prior art regulators, the regulating spring acting on the shutter must be decompressed and the top of the regulator removed en bloc.

The parts to be removed are often very heavy because they are used to regulate extremely high flow rates and therefore have to oppose exceedingly high pressure. For this reason, handling them involves considerable effort and risks for maintenance personnel.

Moreover, the need to remove highly compressed, preloaded springs exposes personnel to further risk.

Other problems arise on reassembling the regulator when the spring that was decompressed and removed has to be put back into the regulator and preloaded again, an operation that may even require a special press or a complex screw-operated device.

SUMMARY OF THE DISCLOSURE

The aim of this disclosure is to provide a pressure regulator that overcomes the above mentioned disadvantages and that has a simple and inexpensive structure and that is practical to maintain.

Another aim of the disclosure is to simplify the procedures for assembling and disassembling the parts inside the regulator by greatly reducing the number of components that need to be removed.

The technical characteristics according to the aforementioned aims may be easily inferred from the contents of the appended claims, especially claim 1, and also any of the claims that depend, either directly or indirectly, on claim 1.

The disclosure also relates to a method for assembling a pressure regulator and a method for disassembling a pressure regulator.

The assembling method may be defined as a method for assembling a gas pressure regulator including inserting a regulator spring unit into a shutter, preloading the regulator spring unit, inserting the shutter into a main body of a regulator through a suitable opening, rigidly connecting the shutter to a respective actuating means and closing the opening with a closing element. The disassembling method may be defined as a method for disassembling a pressure regulator including removing a first closing element from the regulator, disconnecting a shutter from a respective actuating means, and extracting the shutter from the main body of the regulator.

BRIEF DESCRIPTION OF THE DRAWINGS

Moreover, the advantages of the disclosed gas pressure regulator and methods associated therewith are apparent from the detailed description which follows, with reference to the accompanying drawings which illustrate a preferred embodiment of the invention provided merely by way of example without restricting the scope of the inventive concept, and in which.

DETAILED DESCRIPTION

Figure 1:
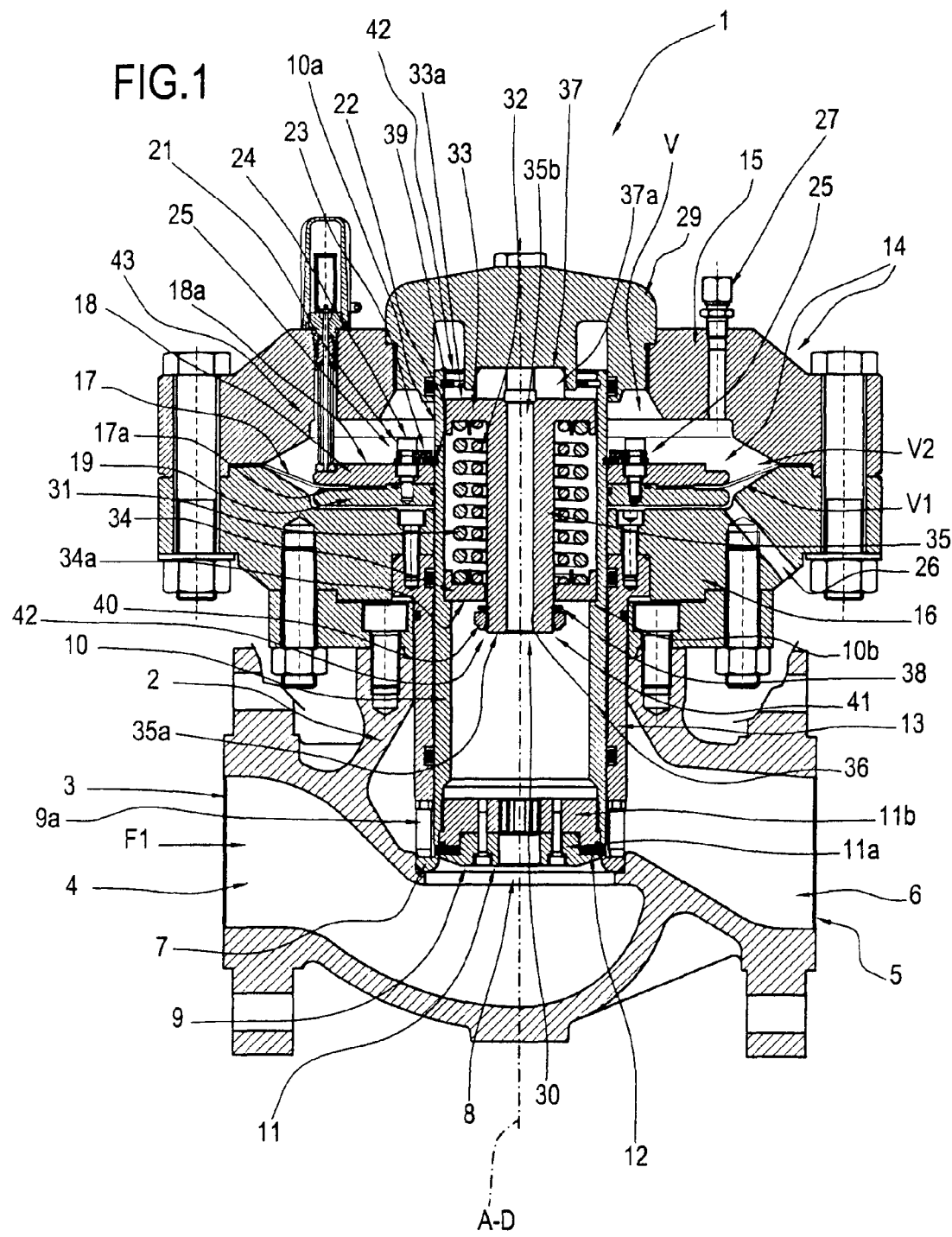
FIG. 1 illustrates a preferred embodiment of the disclosed pressure regulator in a schematic cross section.

With reference to FIG. 1, the numeral 1 denotes in its entirety a gas pressure regulator made in accordance with this invention.

The pressure regulator 1 comprises a main body 2 with an inlet opening 3 through which the gas enters at a first delivery pressure, said inlet opening 3 being connected to a respective first inlet pipe 4, and a gas outlet opening 5 connected to a respective second outlet pipe 6 in which the gas flows at a pressure that is different from the delivery pressure.

The second outlet pipe 6 is located downstream of the first inlet pipe 4 relative to the direction, indicated by the arrow F1, in which the gas flows through the regulator 1.

Between the first pipe 4 and the second pipe 6, there is a ring 7 defining a calibrated gas passage 8.

The regulator 1 also comprises, inside it, a valve plug or shutter 9 that moves lengthwise along a first defined line D to adjust the opening of the calibrated passage 8 between a first end position, illustrated in FIG. 1, in which the passage is closed, and a fully open position which is not illustrated in the accompanying drawings.

The shutter 9 comprises a hollow cylindrical body 10 having a central axis A and, at its lower end 9a, an element 11 for shutting off the calibrated passage 8.

The shut-off element 11 comprises two blocks 11a, 11b attached to the cylindrical body 10, the two blocks 11a, 11b having, tightened between them, a seal pad 12 designed to engage the aforementioned ring 7 in order to close the gas passage 8.

The shutter 9 is slidably accommodated in a cylindrical liner 13 stably attached to the main body 2.

The main body 2 has fitted over it a device 14 for actuating the shutter 9, the device 14 comprising a first, upper concave cover 15 and a second, lower, concave cover 16, coupled in such a way that their concavities face each other to define a delimited volume V.

The volume V houses an annular diaphragm 17 whose outer edge is held tight between the two covers 15, 16, the diaphragm 17 dividing the volume V into two chambers V1, V2 whose volumetric size varies as a function of the operating parameters of the pressure regulator 1.

The actuating device 14 also comprises two flanges 18 and 19, respectively upper and lower, which hold tight between them an inside edge 17a of the annular diaphragm 17.

Figure 4:
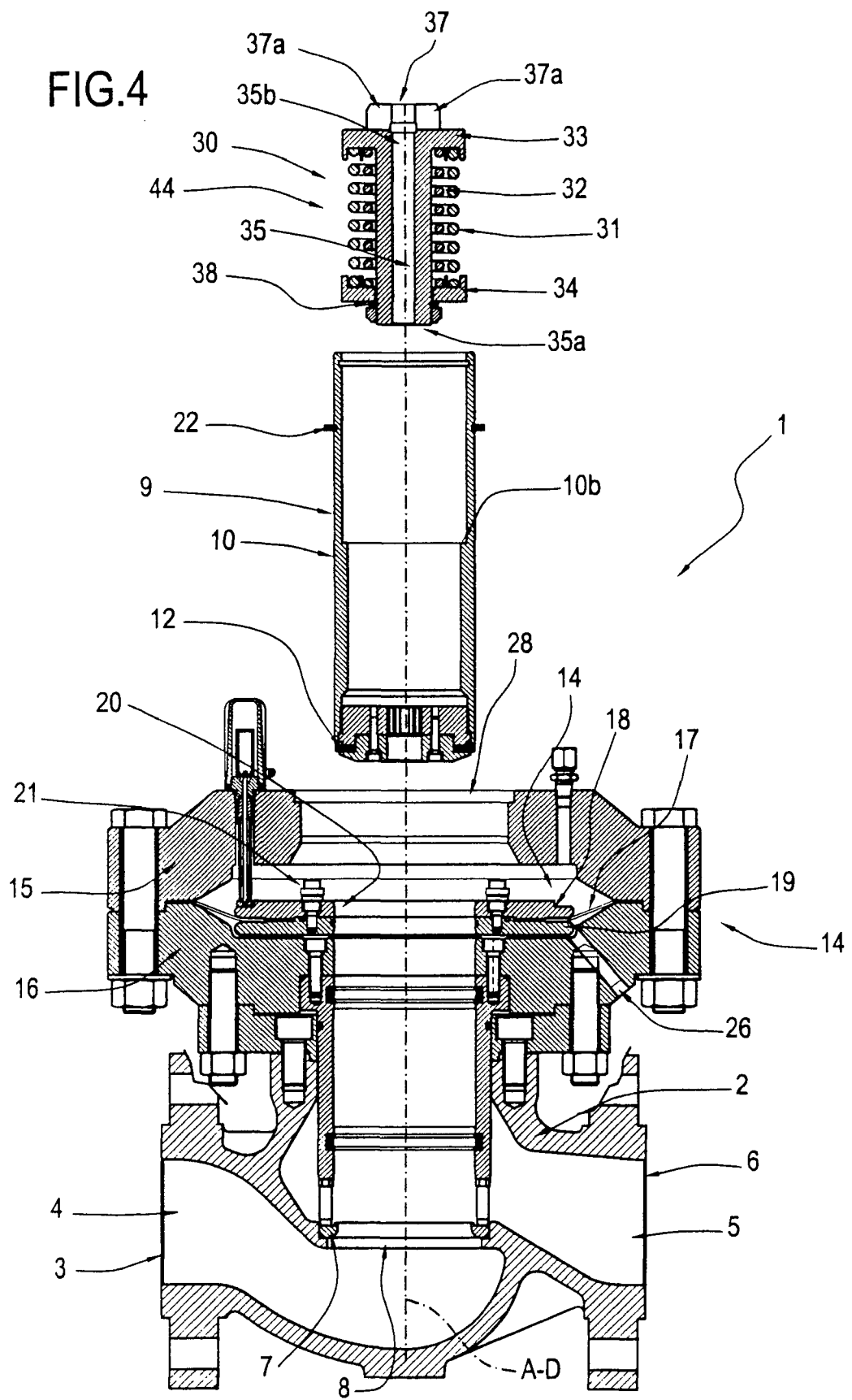

On the inside of them, the two flanges 18, 19, which are substantially annular in shape, form an opening 20, shown in FIG. 4, through which the cylindrical body 10 of the shutter 9 is inserted.

The two flanges 18, 19 are securely joined to each other and connected to the shutter 9 by a plurality of fastening elements 21.

Looking in more detail, on an outer face 10a of the cylindrical body 10 of the shutter 9, there is a first snap ring 22 that abuts against a top face 18a of the upper flange 18 and is forced onto it by the aforementioned fastening elements 21 which comprise plates 23 attached to the flange 18 itself by respective bolts 24.

The fastening elements 21 constitute removable connecting means 25 between the diaphragm 17 and the shutter 9.

The two chambers V1, V2 into which the volume V is divided are designed to receive gas at given pressures through respective feed pipes 26, 27.

Figure 2:
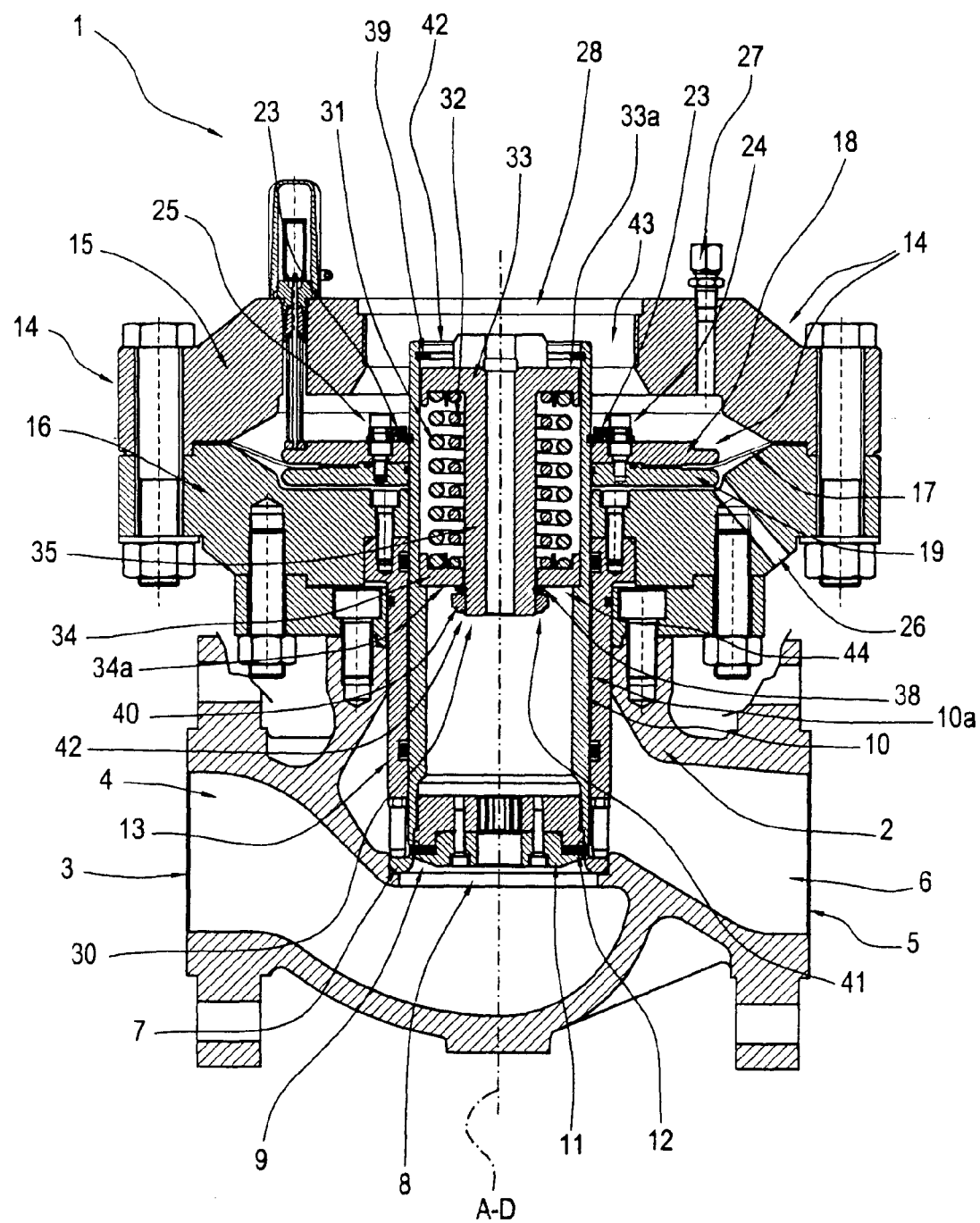
FIGS. 2, 3 and 4 are schematic cross sections, and with some parts cut away for clarity, of the pressure regulator of FIG. 1 in three different stages of its disassembly/assembly.

The upper cover 15 has made in it a respective opening 28, shown in FIG. 2, through which the shutter 9 can pass, the opening 28 being closed by a removable cap 29 during operation of the regulator 1.

The cylindrical body 10 of the shutter 9 houses a regulator spring unit 30 comprising two helical springs 31, 32 fitted coaxially around the above mentioned central axis A and acting by compression along the axis A itself.

The regulator spring unit 30 also comprises a first and a second regulator plate 33, 34, respectively upper and lower, positioned in contact with respective opposite ends of the springs 31, 32.

The upper plate 33 comprises a first, downwardly extending cylindrical portion 35 whose bottom end 35a is inserted into a matching central hole 36 made in the lower regulator plate 34.

The first cylindrical portion 35 of the regulator plate 33 has a hole 35b running through it.

The upper regulator plate 33 also comprises a second, upper cylindrical portion 37 having a plurality of radial openings 37a.

The through hole 35b and the radial openings 37a made respectively in the first and second cylindrical portions 35, 37 of the upper regulator plate 33 are designed to place the underside 34a of the lower regulator plate 34 in fluid communication with the top face 33a of the upper regulator plate 33.

The lower regulator plate 34 abuts against a circumferential ledge made inside the hollow cylindrical body 10.

A second snap ring 38 that fits into a circumferential groove made in the lower cylindrical portion 35 of the upper regulator plate 33 constitutes a retaining element that defines a maximum relative distance between the regulator plates.

Additional retaining elements, for safety, comprise a third snap ring 39 that fits into a circumferential groove made inside the cylindrical body 10 of the shutter, close to its upper end, and a first ring nut 40 screwed onto the bottom end 35a of the portion 35.

The retaining elements 38, 39, 40 thus constitute retaining means 42 designed to determine a maximum relative distance between the regulator plates 33, 34. All three of them may be used, as in the embodiments illustrated in the accompanying drawings or they may be used alternatively, as in other embodiments that are not illustrated.

The lower cylindrical portion 35 of the upper regulator plate 33 and the hole 36 in the lower regulator plate 34 constitute, for the regulator spring unit 30, means 41 for slidably connecting the regulator plates 33, 34 to each other.

The actuating device 14 comprising the above mentioned covers 15, 16, the diaphragm 17 and the flanges 18, 19 constitutes, for the pressure regulator 1 actuating means 43 for producing the operating movement of the shutter 9.

The regulator spring unit 30 comprising the springs 31, 32 and the regulator plates 33, 34 constitutes, for the pressure regulator 1, spring means 44 for opposing the movement of the shutter 9.

Figure 5:
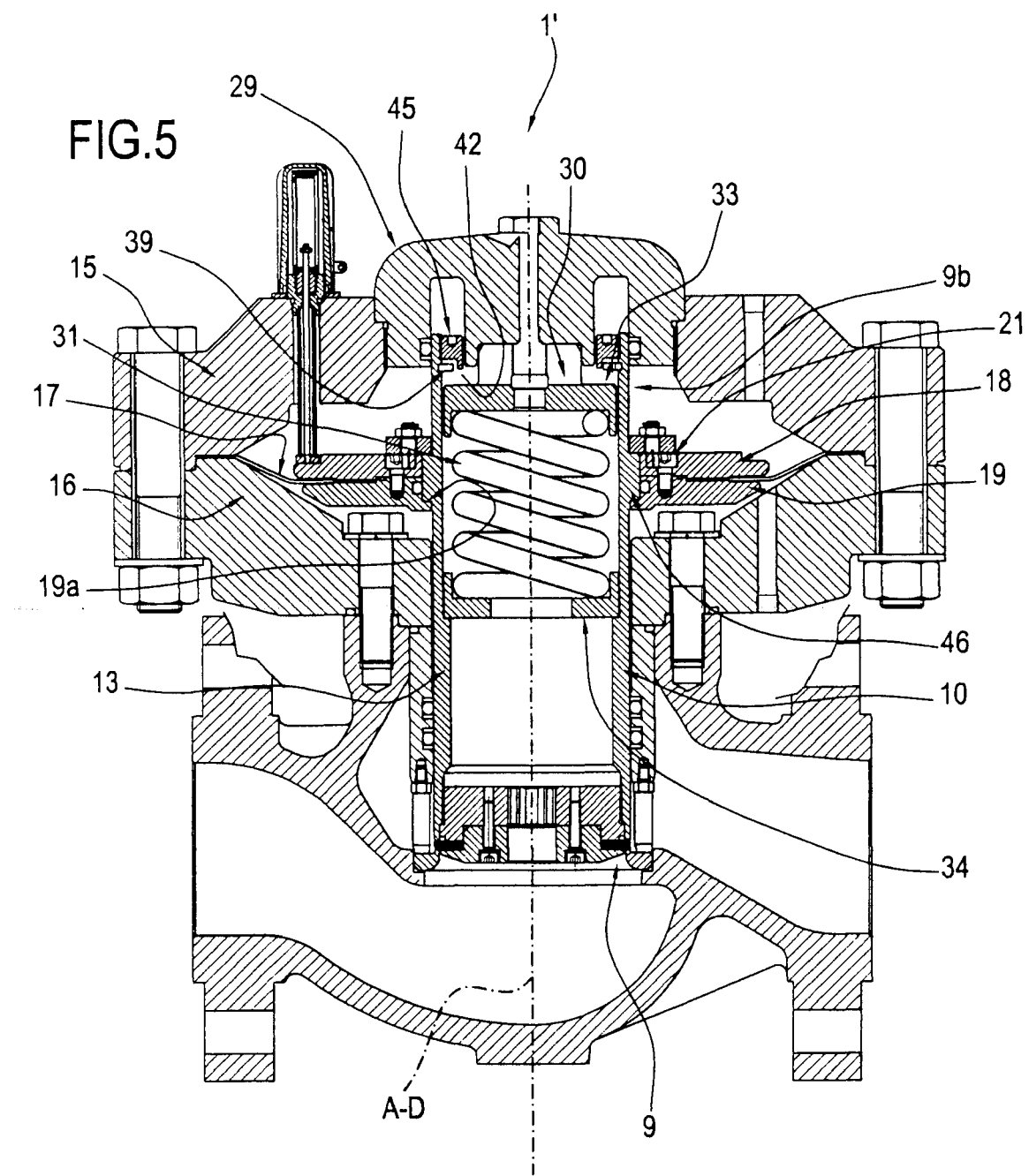
FIG. 5 shows a first alternative embodiment of a pressure regulator.

FIG. 5 illustrates an alternative embodiment of the pressure regulator 1 described above with reference to FIGS. 1 to 4.

The pressure regulator of FIG. 5 is labeled 1' in its entirety but, for simplicity of description, the component parts of it that are the same or similar to the ones already described with reference to the regulator 1 are denoted, in FIG. 5, by the same reference numerals as those used in FIGS. 1 to 4.

Basically, the regulator 1' differs from the regulator 1 in that the regulator plates 33 and 34 are not slidably connected to each other.

In other words, the regulator spring unit 30, including the helical spring 31 of the regulator plates 33, 34, is assembled in the predetermined preloaded state directly inside the shutter 9, unlike the regulator 1, in which the regulator spring unit 30 is first assembled and then placed in the shutter.

As regards the retaining means 42, a snap ring 39 is fitted in a circumferential groove made inside the cylindrical body 10 of the shutter and a second ring nut 45 is screwed, above the ring 39, into a threaded portion at the top end 9b of the shutter 9 itself.

The second ring nut 45 is used for safety in the event of failure of the snap ring 39.

Another difference between the regulator 1' and the regulator 1 lies in the configuration of the fastening elements 21 that attach the flanges 18, 19 to the shutter 9.

As illustrated in FIG. 5, the shutter 9 of the regulator 1' comprises an annular protrusion 46 which is made on the outside face 10a of the cylindrical body 10 of the shutter 9 and which abuts against a circumferential ledge 19a made on the lower flange 19.

The fastening elements 21 comprise a plurality of plates 23 which, by means of customary screw connections, force the annular protrusion 46 against the unit consisting of the two plates 18 and 19 stably connected to each other.

Figure 6:
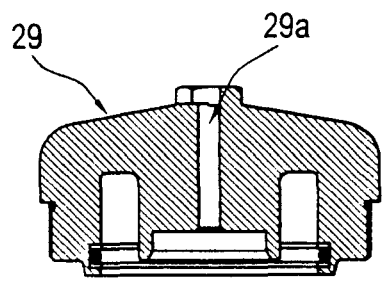
FIG. 6 is a view in cross section, of another embodiment of a part of the pressure regulator shown in the figures listed above.

FIG. 6 illustrates another embodiment of the removable cap 29 where the cap 29 itself comprises a central channel 29a to place the outside and the inside of the shutter 9 in fluid communication with each other. In other words, obviously, when the cap 29 is fitted to the pressure regulator 1, the channel 29a may be used, for example, to measure the pressure of the gas flowing in through the inlet pipe 4.

Figure 7:
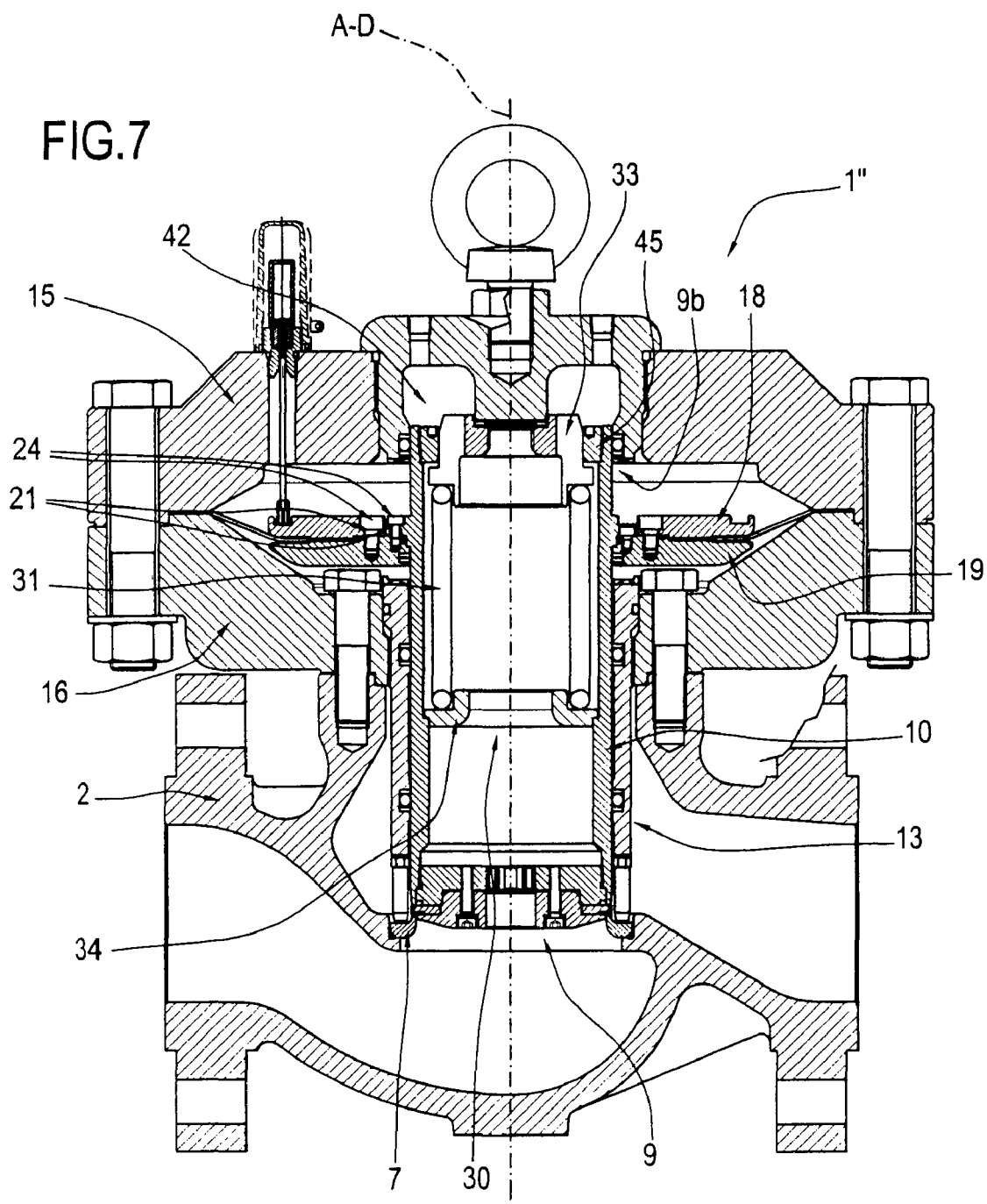
FIG. 7 illustrates another preferred embodiment of a pressure regulator in a schematic cross section.

FIG. 7 illustrates yet another embodiment of the pressure regulators 1 and 1' described above with reference to FIGS. 1 to 5.

The pressure regulator of FIG. 7 is labeled 1" in its entirety but, for simplicity of description, the component parts of it that are the same or similar to the ones already described with reference to the regulators 1 and 1' are denoted, in FIGS. 7 to 10, by the same reference numerals as those used in FIGS. 1 to 5.

Basically, the regulator 1" differs from the regulators 1 and 1' in that the cylindrical liner 13 that slidably houses the shutter 9, is not stably attached to the main body 2 by locking the lower cover 16 to it but is screwed directly to the cover 16 itself.

Figure 10:
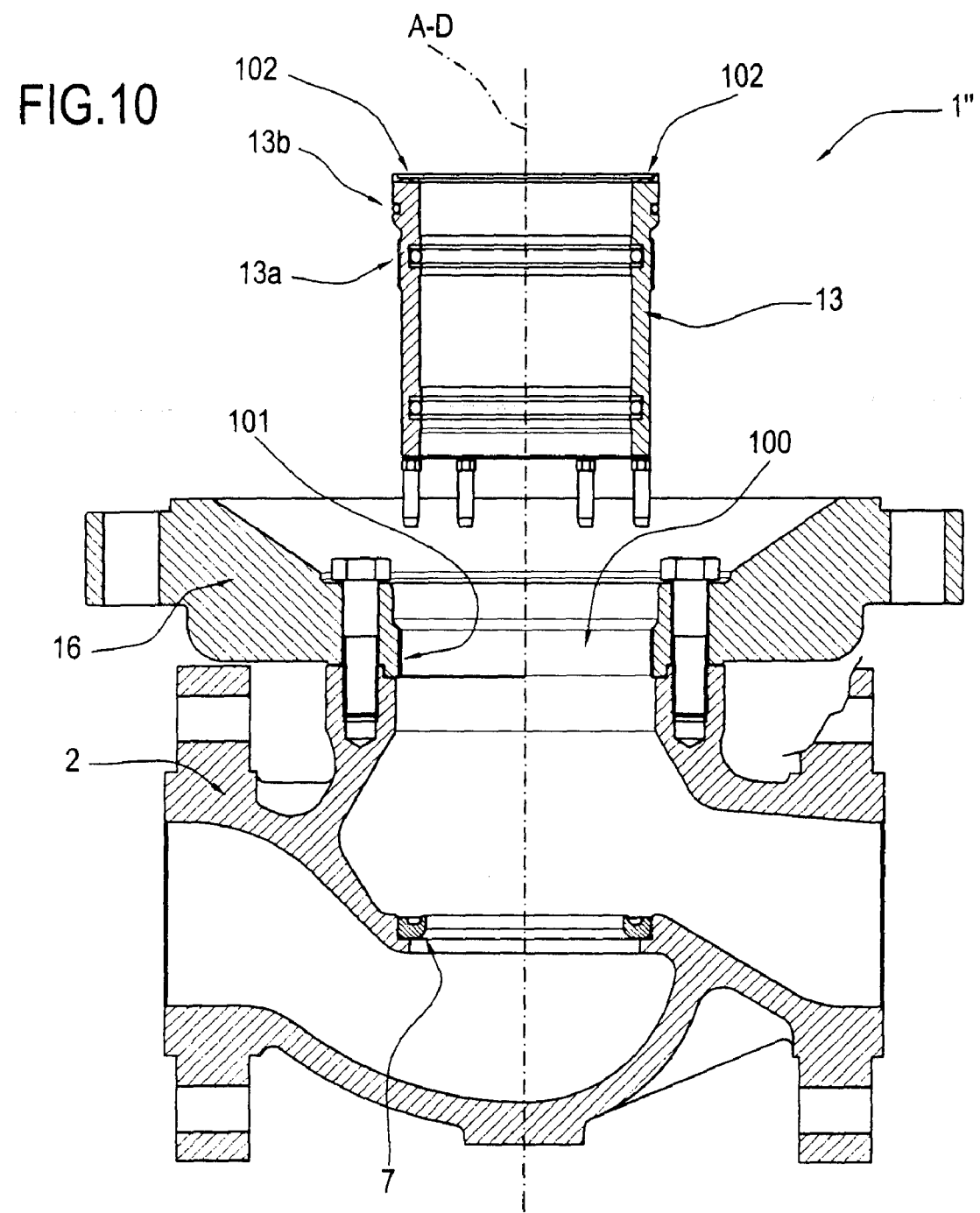

Looking in more detail, as clearly shown in FIG. 10, the lower cover 16 has a central circular opening 100 whose inside surface has a threaded portion 101.

Similarly, a portion 13a of the outside surface of the cylindrical liner 13 is threaded so that it can be screwed to the threaded portion 101 of the cover 16.

Thus, as described in more detail below, the liner 13 can be inserted into and extracted from the main body 2 without having to remove the lower cover 16 from its housing.

With reference to FIG. 7, as regards the retaining means 42, a second ring nut 45 is screwed to a respective threaded inside portion at the top end 9b of the shutter 9 itself.

Unlike the regulators 1 and 1' described above, the upper regulator plate 33 of the regulator 1" does not have the snap ring 39 inserted in a groove inside the cylindrical body 10 but only the ring nut 45.

Another difference between the regulator 1" and the regulators 1 and 1' lies in the configuration of the fastening elements 21 that attach the flanges 18, 19 to the shutter 9.

As illustrated in FIG. 7, the fastening elements 21 comprise a plurality of screws 24 screwed into respective threaded holes made in the lower flange 19 to connect the latter directly to the shutter 9.

Figure 8:
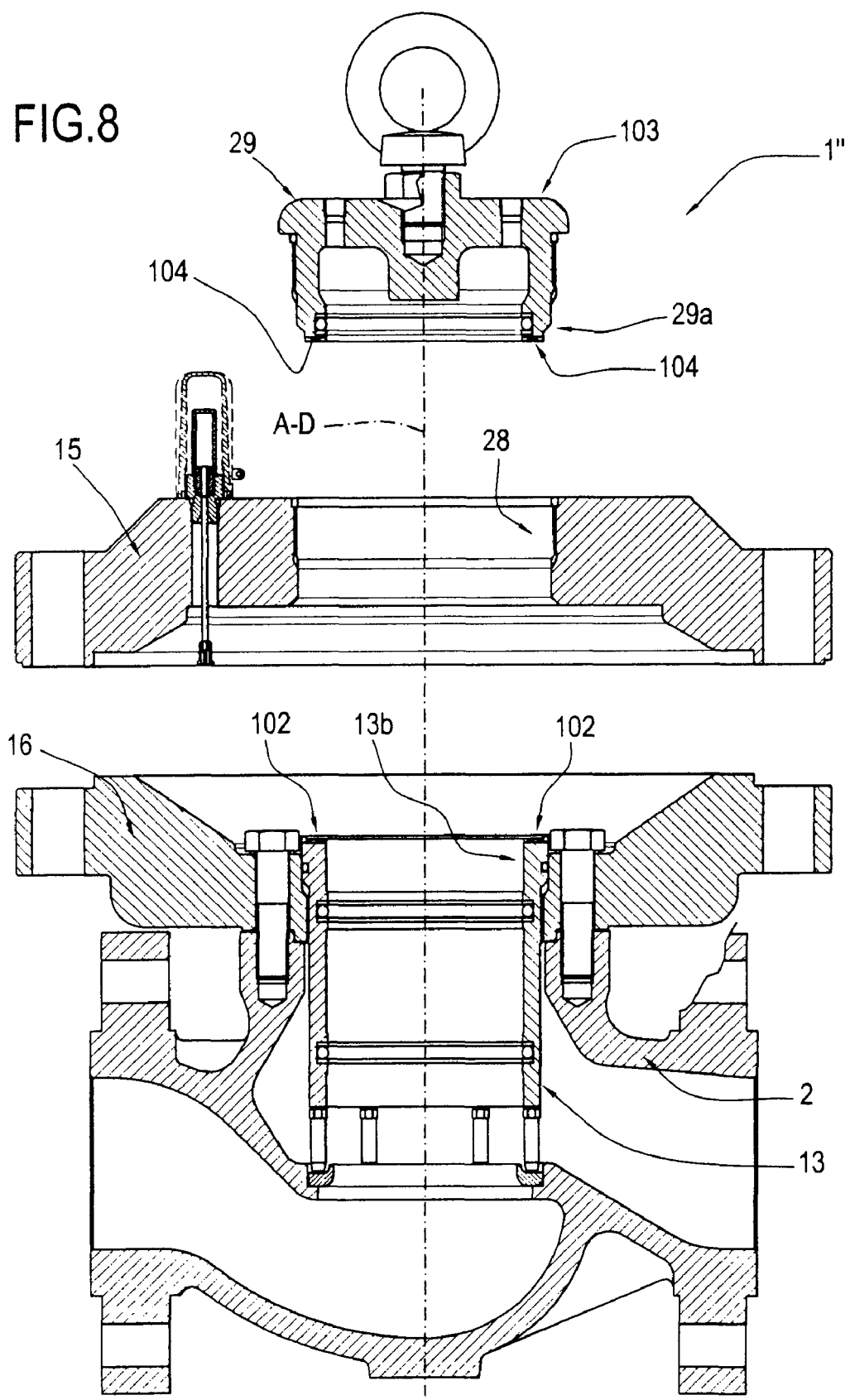
FIGS. 8, 9 and 10 are schematic cross sections, and with some parts cut away for clarity, of the pressure regulator of FIG. 7 in three different stages of its disassembly/assembly.
Figure 9:
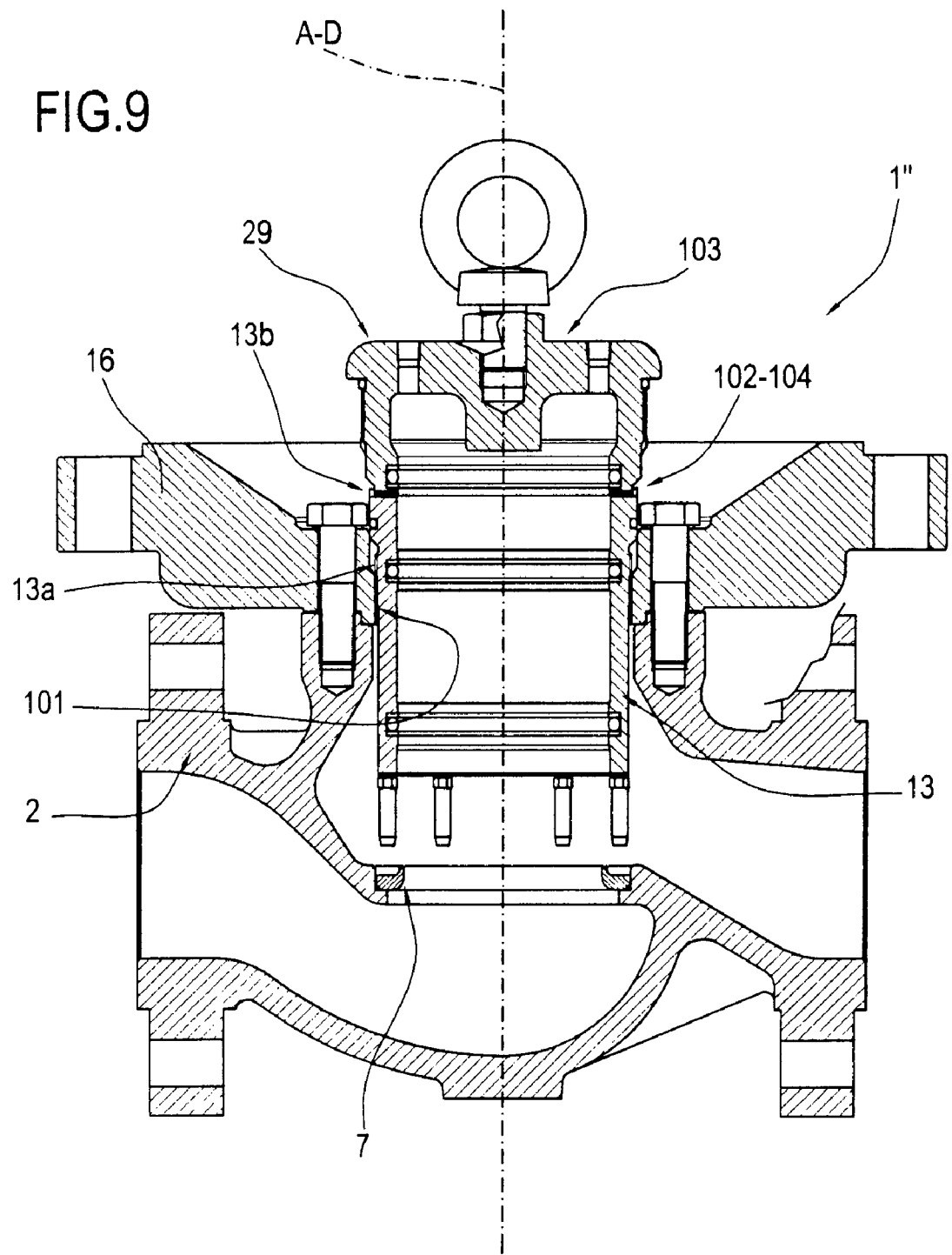

As shown in FIGS. 8 and 9, the liner 13 comprises, at its top end 13b, a plurality of engagement elements 102, distributed circumferentially and designed to engage a respective screwing/unscrewing tool 103.

Advantageously, the engagement elements 102 consist of protrusions alternated with cavities, not illustrated in detail, designed to mesh with respective engagement elements 104, consisting of matching protrusions and cavities, made in the screwing/unscrewing tool 103.

The elements 102 constitute means for engaging the liner 13 with a respective screwing/unscrewing tool 103.

As illustrated in FIG. 8, in a preferred embodiment, the engagement elements 104 are made on a lower annular end 29a of the removable cap 29, which thus constitutes the tool 103 for screwing/unscrewing the cylindrical liner 13.

Leaving aside the operation of the pressure regulator 1 illustrated in FIG. 1, which, in use, is basically as described in the introduction to this specification, the steps for disassembling the shutter 9 from the pressure regulator 1 will now be described in detail.

The disassembling procedure described below may be used, for example, to change the seal pad 12 located at the shut-off element 11.

With reference to FIG. 1, where the regulator 1 is illustrated in the assembled state, the shutter 9 is fitted inside the cylindrical liner 13 and is designed to slide along its axis A in order to adjust the opening of the calibrated passage 8 in such a way that the pressure of the gas in the outlet pipe 6 downstream of the passage 8 itself is changed according to requirements.

As stated, the shutter 9 is illustrated in FIG. 1 in the end position in which the calibrated gas passage 8 is closed.

Starting from the configuration shown in FIG. 1, assuming that gas inflow has been stopped upstream of the regulator 1 itself, the procedure for extracting the shutter 9 from the main body 2 comprises first of all the step of removing the cap 29 which is coupled, advantageously by screwing, to the opening 28 made in the upper cover 15.

FIG. 2 shows the regulator 1 after the cap 29 has been removed.

Because the cap 29 acts directly on the top face 33a of the upper regulator plate 33 to compress the regulator spring unit 30, its removal causes the two regulator plates 33, 34 to move away from each other, thereby reducing the preloading force of the regulator spring unit 30.

As clearly illustrated in FIG. 2, after the cap 29 has been removed, the two regulator plates 33, 34 move to a position in which they are as far apart as possible.

This position is determined by the second snap ring 38 which abuts against the underside 34a of the lower regulator plate 34.

Starting from the configuration illustrated in FIG. 2, slackening the screws 24 and turning the plates 23 disengages the flanges 18, 19 from the shutter 9 and thus, indirectly, separates the diaphragm 17 and the shutter 9.

Figure 3:
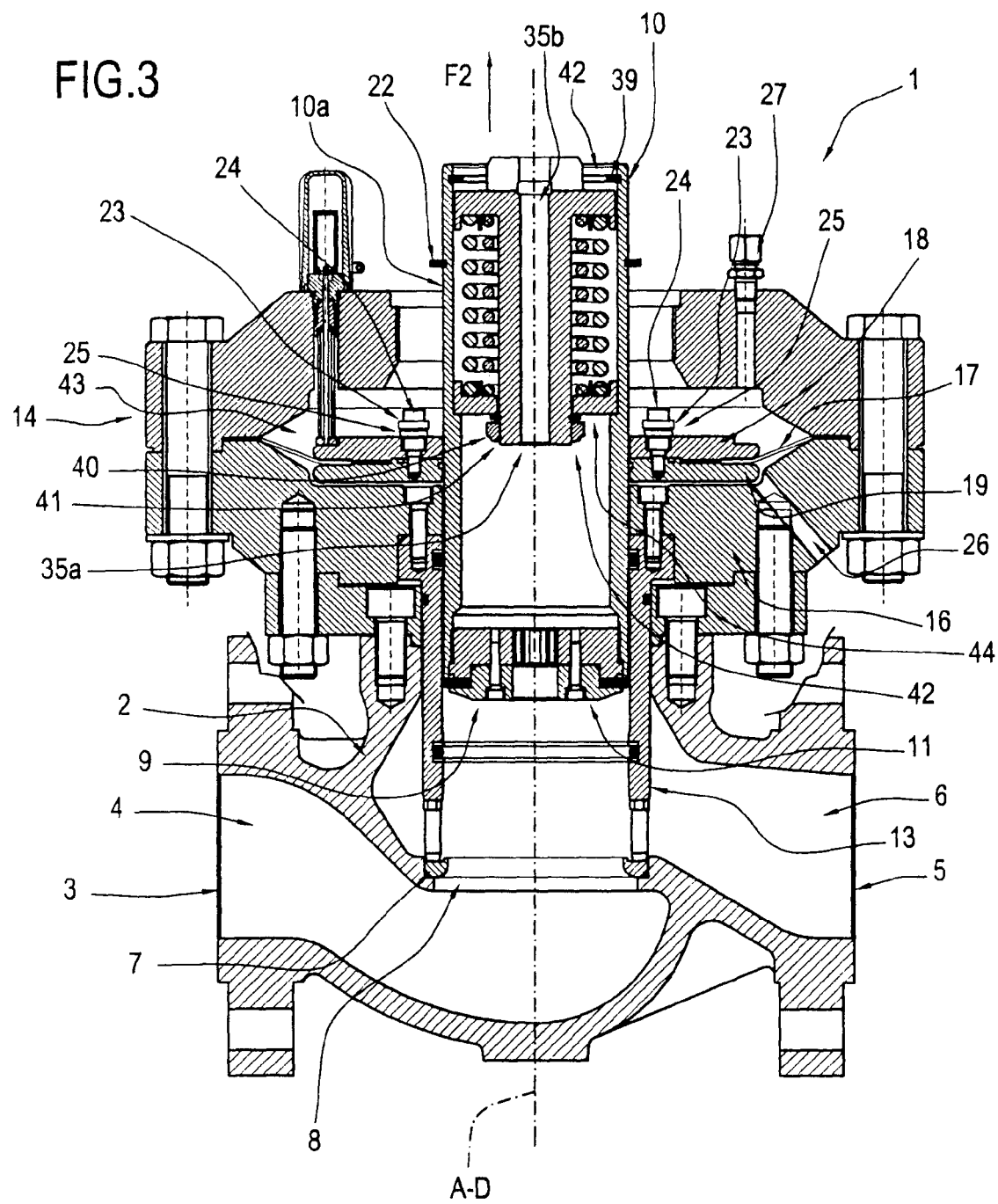

FIG. 3 shows the plates 23 in their rotated position in which they are disengaged from the first snap ring 22.

Thus, as illustrated in FIG. 3, the shutter 9 can be pulled along line D in the direction of the arrow F2 to extract it from the cylindrical liner 13 which accommodates it during normal operation.

The shutter 9 can then be passed through the opening 28 made in the upper cover 15 in such a way as to separate the shutter 9 itself from the pressure regulator 1.

Advantageously, therefore, the shutter 9 can be taken out of the pressure regulator 1 without having to remove either the first, upper cover 15 or the second, lower cover 16.

The procedure for disassembling the regulator 1 described above with reference to FIGS. 1 to 3 can also be applied to the regulator 1' illustrated in FIG. 5.

As shown FIGS. 3 and 4 with reference to the regulator 1, removing the third snap ring 39 from inside the cylindrical body 10 of the shutter 9 makes it possible to extract the regulator spring unit 30 from the cylindrical body 10 itself since there are no obstacles to prevent the passage of the regulator plates 33, 34.

FIG. 4 shows the regulator spring unit 30 extracted from the shutter 9 which has in turn been extracted from the liner 13 that houses it in the main body 2 of the pressure regulator 1.

The shutter seal pad 12 is thus relatively easy to change.

Advantageously, the regulator spring unit 30, when extracted from the pressure regulator 1, remains preloaded to a predetermined extent: indeed, the springs 31, 32 are at least partially compressed between the regulator plates 33 and 34.

The minimum preloaded condition of the springs 31, 32 is therefore independent of whether the regulator spring unit 30 is inside the pressure regulator or not.

In the embodiment 1' illustrated in FIG. 5, the minimum preloaded condition of the spring 31 is also independent of whether or not the regulator spring unit 30 is inside the pressure regulator 1' but it is not independent of whether or not the unit 30 itself is inside shutter 9, since it is only after the unit 30 has been inserted into the shutter 9 that it can be preloaded to the required extent.

In other words, the regulator spring unit 30 can be preloaded to the required extent outside the regulator 1' by simply assembling the unit 30 and the cylindrical body 10 of the shutter 9 when the latter is outside the regulator 1'.

The term "regulating plate" referring to the components 33 and 34 of the regulator spring unit 30 is used to denote any mechanical part of any shape and size used to transfer to the spring the compressive force necessary to reach the required preloading value and to keep the spring in a predetermined preloaded state.

Similarly to what is described above with reference to the embodiments 1 and 1' of the pressure regulator disclosed herein, the procedures for assembling and disassembling the shutter 9 of the embodiment labeled 1" illustrated in FIGS. 7 to 10 are substantially the same and will not be repeated below.

As already stated, the disassembling procedures described above are necessary, for example, to change the seal pad 12 located at the shut-off element 11.

The disassembly procedure below, on the other hand, is used to extract the cylindrical liner 13, in which the shutter 9 is slidably engaged, from the main body 2 and is described with reference to the regulator 1".

FIG. 8 shows the regulator 1" partially disassembled; in particular, it is assumed that the regulator 1" has been stripped, according to the procedure described above, of the shutter 9, of the related regulator spring unit 30 and of the unit consisting of the diaphragm 17 and the two respective flanges 18 and 19.

Also, the fastening bolts attaching the upper concave cover 15 to the lower concave cover 16 have been removed and the upper cover has been lifted.

Advantageously, the cap 29 has also been unscrewed from the respective threaded opening 28 in the upper cover 15.

As illustrated in FIG. 9, after the first, upper cover 15 has been removed, the end 13b of the cylindrical liner 13 is freely accessible from above.

Once the cap 29 has been removed from the upper cover 15, it can be placed on the top end 13b of the liner 13 in such a way as to mesh the respective engagement elements 104, 102, consisting of matching cavities and protrusions, so that the liner 13 can be unscrewed from its housing.

FIG. 9 shows the liner 13 while it is being unscrewed from the regulator 1", at an intermediate stage, with the respective threaded portions 13a, 101 of the liner 13 itself and of the lower cover 16 still partly engaged with each other.

In FIG. 10, the liner 13 has been completely screwed off the threaded portion 101 of the central opening 100 in the lower cover 16.

Advantageously, therefore, the procedure described above can be used to remove the liner 13 without having to remove the second, lower cover 16 from the main body 2 of the regulator.

This is particularly useful when disassembling pressure regulators used for high flow rates which have considerably large and heavy covers that are difficult to handle.

According to a constructional variant of the pressure regulator of FIG. 6, not illustrated but nevertheless falling within the scope of the invention, the threaded portion 13a of the liner 13 may be screwed directly to a respective threaded portion of the main body 2.

What is claimed is:

1. A gas pressure regulator, comprising:
   a main body having a gas inlet pipe and a gas outlet pipe;
   a calibrated gas passage through which gas flows from the gas inlet pipe to the gas outlet pipe;
   a shutter housed at least partially in the main body and mobile lengthwise along a first defined line to adjust an opening of the calibrated gas passage between a first end position in which the calibrated gas passage is closed and a second end position in which the calibrated gas passage is fully open;
   a shutter actuator adapted to actuate the shutter;
   a spring device that opposes the movement of the shutter from the first end position to the second end position, the spring device comprising at least one regulator spring unit disposed within the shutter and acting directly or indirectly on the shutter, wherein the regulator spring unit comprises a first regulator plate, a second regulator plate, and a helical spring disposed between the first regulator plate and the second regulator plate, and wherein the first regulator plate and the second regulator plate compress the helical spring such that the helical spring is in a preloaded state when the helical spring is disposed within the shutter.

2. The gas pressure regulator according to claim 1, further comprising a retainer that defines a maximum distance between the first and second regulator plates.

3. The gas pressure regulator according to claim 2, wherein the retainer is a snap ring.

4. The gas pressure regulator according to claim 3, further comprising a ring nut that threadedly engages a threaded portion of the top end of the shutter, wherein the ring nut is disposed between the snap ring and the top end of the shutter.

5. The gas pressure regulator according to claim 1, wherein the shutter comprises a hollow cylindrical body, and wherein the regulator spring unit is housed in the cylindrical body.

6. The gas pressure regulator according to claim 1, wherein the shutter actuator comprises a diaphragm operatively coupled to the shutter and housed in a volume defined by a first cover and a second cover connected to the main body.

7. The gas pressure regulator according to claim 6, wherein the diaphragm is held tight between an upper flange and a lower flange interposed between the shutter and the diaphragm, and wherein the upper flange and the lower flange each have a first central opening through which the shutter can pass at least partially when the shutter is being inserted into or extracted from the pressure regulator.

8. The gas pressure regulator according to claim 7, wherein an annular protrusion is formed on an outside face of the shutter, and wherein the annular protrusion abuts a circumferential ledge of the lower flange.

9. The gas pressure regulator according to claim 8, wherein a fastening element couples a plate to the upper flange such that a bottom surface of the plate engages a top surface of the annular protrusion and a top surface of the upper flange.

10. The gas pressure regulator according to claim 8, wherein a plurality of fastening elements couple a plurality of plates to the upper flange such that a bottom surface of each of the plurality of plates engages a top surface of the annular protrusion and a top surface of the upper flange.

11. The gas pressure regulator according to claim 9, wherein the fastening element is a screw.

12. The gas pressure regulator according to claim 1, wherein
the first regulator plate has a top surface and a bottom surface, wherein the first regulator plate is slidably disposed within the shutter,
the second regulator plate has a top surface and a bottom surface, wherein the second regulator plate is secured within the shutter such that the second regulator plate is stationary relative to the shutter,
wherein the helical spring is disposed between the bottom surface of the first regulator plate and the top surface of the second regulator plate, the helical spring providing a spring force acting on both the bottom surface of the first regulator plate and the top surface of the second regulator plate,
wherein a retainer is secured to a top portion of the shutter, the retainer being adapted to engage the top surface of the first regulator plate to prevent the spring force from axially displacing the first regulator plate from the second regulator plate, and
wherein an uncompressed length of the helical spring is greater than the axial distance between the bottom surface of the first regulator plate and the top surface of the second regulator plate when the top surface of the first regulator plate engages the retainer.

13. The gas pressure regulator according to claim 12, wherein a circumferential ledge is formed within the shutter, the ledge supporting the bottom surface of the second regulator plate to secure the second regulator plate within the shutter.

14. The gas pressure regulator according to claim 12, wherein the retainer is a snap ring.

15. The gas pressure regulator according to claim 2, wherein the retainer is coupled to a top end of the shutter.

16. A method for assembling a gas pressure regulator having a main body with a gas inlet pipe and a gas outlet pipe, a calibrated gas passage through which gas flows from the gas inlet pipe to the gas outlet pipe, a shutter housed at least partially in the main body and mobile lengthwise along a first defined line to adjust an opening of the calibrated gas passage between a first end position in which the calibrated gas passage is closed and a second end position in which the calibrated gas passage is fully open, a shutter actuator adapted to actuate the shutter, and a spring device that opposes the movement of the shutter from the first end position to the second end position, the spring device comprising a regulator spring unit that acts directly or indirectly on the shutter, comprising:
preloading the regulator spring unit within the shutter;
inserting the shutter into the main body of the regulator through an opening;
rigidly connecting the shutter to the shutter actuator; and
closing the opening with a removable cap.

17. The method according to claim 16, wherein the regulator spring unit is preloaded by inserting the regulator spring unit into the shutter.

18. The method according to claim 16, wherein preloading the regulator spring unit within the shutter comprises:
inserting a second regulator plate into the shutter;
inserting a helical spring into the shutter;
inserting a first regulator plate into the shutter such that the helical spring is disposed between the first regulator plate and the second regulator plate; and
coupling a retainer to a top portion of the shutter such that the retainer prevents the helical spring from displacing the first regulator plate away from the second regulator plate.

19. A method for disassembling a gas pressure regulator having a main body with a gas inlet pipe and a gas outlet pipe, a calibrated gas passage through which gas flows from the gas inlet pipe to the gas outlet pipe, a shutter housed at least partially in the main body and mobile lengthwise along a first defined line to adjust an opening of the calibrated gas passage between a first end position in which the calibrated gas passage is closed and a second end position in which the calibrated gas passage is fully open, a shutter actuator adapted to actuate the shutter, and a spring device that opposes the movement of the shutter from the first end position to the second end position, the spring device comprising at least one preloaded regulator spring unit disposed within the shutter and acting directly or indirectly on the shutter, comprising:
removing a cap from the regulator;
disconnecting the shutter from the shutter actuator; and
extracting the shutter from the main body of the regulator while the regulator spring unit is in a preloaded state.

\* \* \* \* \*